United States Patent
Smith et al.

(10) Patent No.: US 10,514,975 B2
(45) Date of Patent: Dec. 24, 2019

(54) PREVENTING CORRUPTION BY BLOCKING REQUESTS

(71) Applicant: Nutanix, Inc., San Jose, CA (US)

(72) Inventors: Gregory A. Smith, Oakland, CA (US); Igor Grobman, San Jose, CA (US); Miao Cui, New York, NY (US)

(73) Assignee: NUTANIX, INC., San Jose, CA (US)

( * ) Notice: Subject to any disclaimer, the term of this patent is extended or adjusted under 35 U.S.C. 154(b) by 172 days.

(21) Appl. No.: 15/830,260

(22) Filed: Dec. 4, 2017

(65) Prior Publication Data
US 2018/0157547 A1 Jun. 7, 2018

Related U.S. Application Data

(60) Provisional application No. 62/430,321, filed on Dec. 5, 2016.

(51) Int. Cl.
*G06F 11/00* (2006.01)
*G06F 11/07* (2006.01)
(Continued)

(52) U.S. Cl.
CPC ........ *G06F 11/079* (2013.01); *G06F 9/45558* (2013.01); *G06F 11/0709* (2013.01);
(Continued)

(58) Field of Classification Search
CPC ............. G06F 11/0757; G06F 11/1438; G06F 9/45533; G06F 11/3058
See application file for complete search history.

(56) References Cited

U.S. PATENT DOCUMENTS

| 6,941,379 B1 * | 9/2005 | Dingsor | G06F 9/5027 |
| | | | 709/230 |
| 8,488,446 B1 * | 7/2013 | Brandwine | H04L 69/40 |
| | | | 370/225 |

(Continued)

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

(Continued)

*Primary Examiner* — Charles Ehne
(74) *Attorney, Agent, or Firm* — Foley & Lardner LLP

(57) ABSTRACT

A method and system for managing communication connections in a virtualization environment implemented by a cluster of host machines, each of the host machines comprises a hypervisor, at least one user virtual machine (UVM), a connection manager, and an I/O controller. The system includes a virtual disk accessible by all of the I/O controllers and comprising a plurality of storage devices. The system includes a first host machine of the host machines designated as a leader node, wherein the leader node configured to confirm a second one of the host machines is unreachable; and transmit, in response to the confirmation, an update message to other host machines in the cluster. The update message identifies the unreachable host machine and causes the other host machines to block messages from the unreachable host machine and send an acknowledgement of the update message back to the leader node.

26 Claims, 11 Drawing Sheets

(51) Int. Cl.
*H04L 12/24* (2006.01)
*G06F 9/455* (2018.01)
*H04L 12/26* (2006.01)

(52) U.S. Cl.
CPC ...... *G06F 11/0712* (2013.01); *G06F 11/0727* (2013.01); *G06F 11/0784* (2013.01); *G06F 11/0793* (2013.01); *H04L 41/064* (2013.01); *H04L 41/0659* (2013.01); *H04L 43/0823* (2013.01); *H04L 43/10* (2013.01); *G06F 2009/45579* (2013.01); *G06F 2009/45591* (2013.01); *G06F 2009/45595* (2013.01); *H04L 41/0668* (2013.01); *H04L 41/0677* (2013.01); *H04L 41/0686* (2013.01)

(56) References Cited

U.S. PATENT DOCUMENTS

| | | | |
|---|---|---|---|
| 8,549,518 | B1 | 10/2013 | Aron et al. |
| 8,601,473 | B1 | 12/2013 | Aron et al. |
| 8,850,130 | B1 | 9/2014 | Aron et al. |
| 9,736,016 | B2* | 8/2017 | Brandwine ............ H04L 69/40 |
| 9,772,866 | B1 | 9/2017 | Aron et al. |
| 2007/0195701 | A1* | 8/2007 | Menth .................... H04L 45/00 370/238 |
| 2010/0138535 | A1* | 6/2010 | Jerrim ................... G06F 21/552 709/224 |

OTHER PUBLICATIONS

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jan. 8, 2019), from https://nutanixbible.com/.

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

* cited by examiner

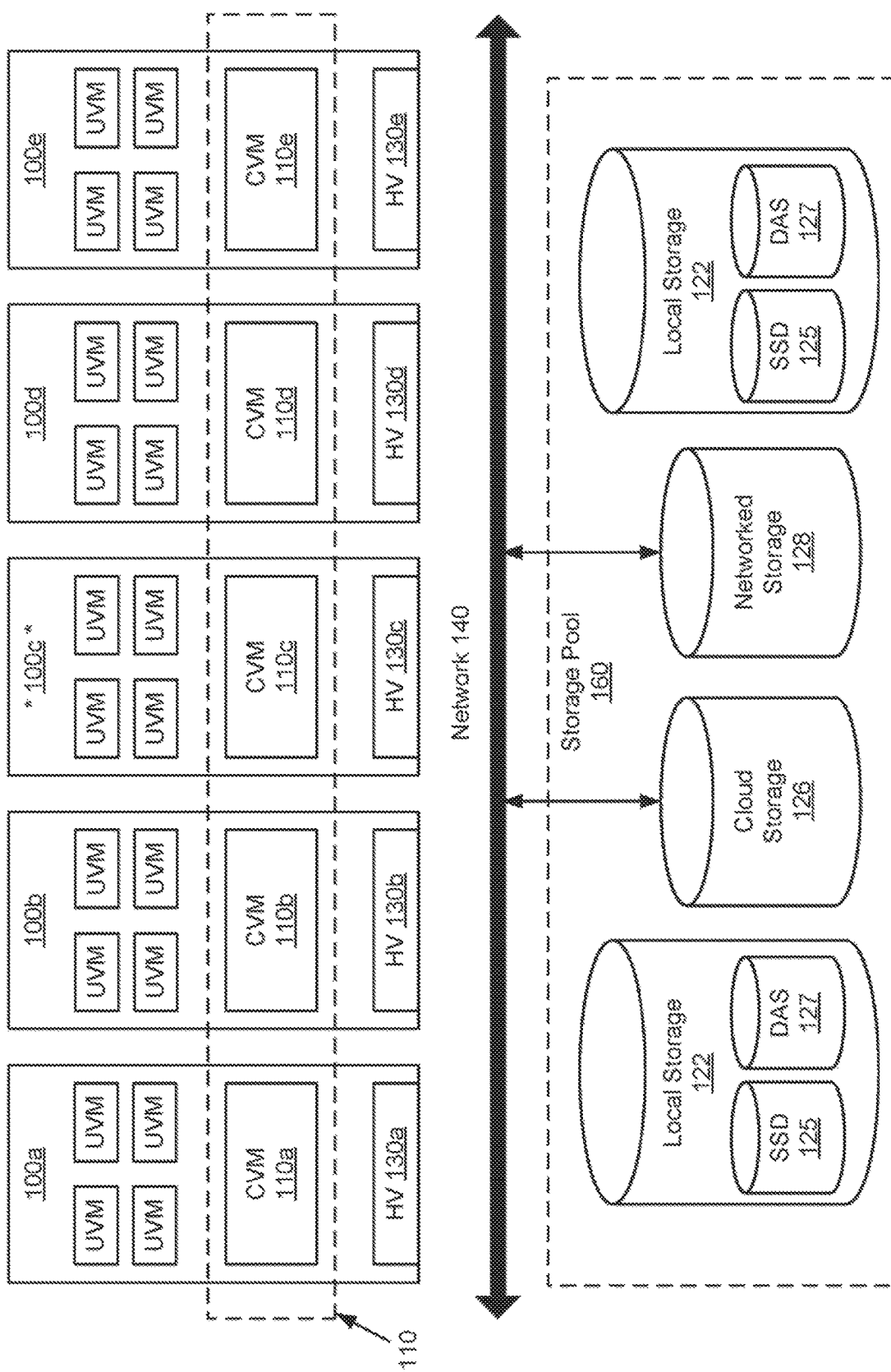

PREVENTING CORRUPTION BY BLOCKING REQUESTS

CROSS REFERENCE TO RELATED APPLICATION

This application claims priority to U.S. Provisional Application 62/430,321, filed Dec. 5, 2016, incorporated by reference in its entirety.

TECHNICAL FIELD

This disclosure generally relates to maintaining graceful failover within a virtualization environment.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Furthermore, there are now products that can aggregate multiple physical machines, running virtualization environments, to not only utilize the processing power of the physical devices to aggregate the storage of the individual physical devices to create a logical storage pool wherein the data may be distributed across the physical devices but appears to the virtual machines to be part of the system that the virtual machine is hosted on. Such systems operate under the covers by using metadata, which may be distributed and replicated any number of times across the system, to locate the indicated data. These systems are commonly referred to as clustered systems, wherein the resources of the group are pooled to provide logically combined, but physically separate systems.

SUMMARY OF PARTICULAR EMBODIMENTS

The present invention provides an architecture for maintaining graceful failover by blocking requests in a virtualization environment. A cluster of physical nodes (e.g., servers) may operate on the same network and share various storage devices. Each node may comprise one or more user VMs (UVMs), one or more controller/service VMs (CVMs), and a hypervisor, all of which may operate on the node. One node may be designated as a leader node. The leader node, via its controller/service virtual machine, may monitor the activity of the hypervisors operating on the other nodes. If a hypervisor on one of the other nodes fails, the leader node—via its controller/service virtual machine—may detect that this hypervisor is unreachable. This may mean that the node on which the hypervisor operates has potentially failed or is otherwise potentially corrupted. This node may be referred to as a failed node, regardless of whether the node has actually failed. The leader node and other live nodes may treat the unreachable node as a failed node. To prevent further corruption from entering the network, the leader node may signal the other nodes to block any request (e.g., I/O request), coming from the failed node. In response to this signal, the other nodes may block requests from the failed node and send an acknowledgement ("ACK") signal back to the leader node. After the leader node receives an ACK from all the other nodes, the cluster may be considered to be secure and protected from further corruption. At some point, the failed node may determine that after a predetermined amount of time, it has not received any responses to its requests. As a consequence to this lack of response, the UVMs operating on the failed node may terminate their own operations, either permanently, or for a set amount of time. If the hypervisor on the failed node is repaired or the corruption on the failed node is eliminated within the set amount of time, the UVMs on the failed node may resume operations on the same node. If the failed hypervisor is not repaired within the set timeframe, or if another reason causes the failed node to be unusable, the UVMs on the failed/corrupted node may be transferred to a new node.

One implementation disclosed herein is a system for managing communication connections in a virtualization environment implemented by a cluster of host machines, each of the host machines comprises a hypervisor, at least one user virtual machine (UVM), a connection manager, and an I/O controller. The system includes a virtual disk accessible by all of the I/O controllers and comprising a plurality of storage devices, wherein the virtual disk configured to communicate I/O transactions with the I/O controllers based on I/O requests the I/O controllers receive from their respective at least one UVM. The system includes a first host machine of the host machines designated as a leader node. In some implementations, the leader node configured to confirm a second one of the host machines is unreachable. In some implementations, the leader node configured to transmit, in response to the confirmation, an update message to other host machines in the cluster. In some implementations, the update message identifies the unreachable host machine and causes the other host machines to block messages from the unreachable host machine and send an acknowledgement of the update message back to the leader node. In some implementations, the update message causes the one or more UVMs running on the second one of the host machines to determine an absence of a response received to a message sent by the one or more UVMs to any other host machines in the cluster and terminate an operation in response to the determination of the absence.

In some implementations, the second one of the host machines is unreachable comprises a failure of the hypervisor of the second one of the host machines or a corruption of the hypervisor of the second one of the host machines. In some implementations, the update message further causes the one or more UVMs running on the second one of the host machines, after a termination of the operation, to determine that a response has been received to a message sent to one of the other host machines in the cluster. In some implementations, the update message further causes the one or more UVMs running on the second one of the host machines, after a termination of the operation, to resume the operation on the same host machine.

In some implementations, the update message further causes the one or more UVMs running on the second one of the host machines, after a termination of the operation, to transfer the operation to a new host machine different from the first one of the host machines and the other host machines.

In some implementations, the transfer of the operation to the new host machine occurs in response to an expiration of a predefined timer, and wherein the predefined timer configured to start in response to a transmission, by the connection manager on the leader node, of an echo-request to the second one of the host machines and stop in response to a receipt of an echo-response from the second one of the host machines.

In some implementations, the leader node confirms the second one of the host machines is unreachable comprises transmission of an echo-request to the second one of the host machines, and a failure to receive an echo-response from the second one of the host machines within a predetermined amount of time.

In some implementations, the connection manager of the leader node sends the echo-request.

In some implementations, the one or more UVMs running on the second one of the host machines terminate the operation comprises a shut-down of the one or more UVMs.

In some implementations, the update message causes the other host machines to identify, in a list maintained by the other host machines, an IP address of the unreachable host machine, wherein the list comprises the I/O controllers of each of the host machines.

In another aspect, the present disclosure is directed to a method for managing communication connections in a virtualization environment implemented by a cluster of host machines, each of the host machines comprises a hypervisor, at least one user virtual machine (UVM), a connection manager, and an I/O controller, wherein a first host machine of the host machines designated as a leader node. The method includes communicating, by the leader node, I/O transactions with a virtual disk based on I/O requests the I/O controller of the leader node receives from the at least one UVM of the leader node; wherein the virtual disk accessible by all of the I/O controllers of the host machines and comprising a plurality of storage devices. In some implementations, the method also includes confirming, by the leader node, a second one of the host machines is unreachable. In some implementations, the method also includes transmitting, by the leader node and in response to the confirmation, an update message to other host machines in the cluster; wherein the update message identifies the unreachable host machine and causes the other host machines to block messages from the unreachable host machine and send an acknowledgement of the update message back to the leader node; and one or more UVMs running on the second one of the host machines to determine an absence of a response received to a message sent by the one or more UVMs to any other host machines in the cluster and terminate an operation in response to the determination of the absence.

In some implementations, the second one of the host machines is unreachable comprises a failure of the hypervisor of the second one of the host machines or a corruption of the hypervisor of the second one of the host machines.

In some implementations, the update message further causes the one or more UVMs running on the second one of the host machines, after a termination of the operation, to determine that a response has been received to a message sent to one of the other host machines in the cluster and resume the operation on the same host machine.

In some implementations, the update message further causes the one or more UVMs running on the second one of the host machines, after a termination of the operation, to transfer the operation to a new host machine different from the first one of the host machines and the other host machines.

In some implementations, the transfer of the operation to the new host machine occurs in response to an expiration of a predefined timer, and wherein the predefined timer configured to start in response to a transmission, by the connection manager on the leader node, of an echo-request to the second one of the host machines, and stop in response to a receipt of an echo-response from the second one of the host machines.

In some implementations, the leader node confirms the second one of the host machines is unreachable comprises transmission of an echo-request to the second one of the host machines, and a failure to receive an echo-response from the second one of the host machines within a predetermined amount of time.

In some implementations, the connection manager of the leader node sends the echo-request.

In some implementations, the one or more UVMs running on the second one of the host machines terminate the operation comprises a shut-down of the one or more UVMs.

In some implementations, the update message causes the other host machines to identify, in a list maintained by the other host machines, an IP address of the unreachable host machine, wherein the list comprises the I/O controllers of each of the host machines.

In another aspect, the present disclosure is directed to a non-transitory computer readable storage medium to store a computer program configured to execute a method for managing communication connections in a virtualization environment implemented by a cluster of host machines, each of the host machines comprises a hypervisor, at least one user virtual machine (UVM), a connection manager, and an I/O controller, wherein a first host machine of the host machines designated as a leader node. In some implementations, the method includes communicating I/O transactions with a virtual disk based on I/O requests the I/O controller of the leader node receives from the at least one UVM of the leader node; wherein the virtual disk accessible by all of the I/O controllers of the host machines and comprising a plurality of storage devices. In some implementations, the method includes confirming a second one of the host machines is unreachable. In some implementations, the method includes transmitting, in response to the confirmation, an update message to other host machines in the cluster; wherein the update message identifies the unreachable host machine and causes the other host machines to block messages from the unreachable host machine and send an acknowledgement of the update message back to the leader node and one or more UVMs running on the second one of the host machines to determine an absence of a response received to a message sent by the one or more UVMs to any other host machines in the cluster and terminate an operation in response to the determination of the absence.

In some implementations, the second one of the host machines is unreachable comprises a failure of the hypervisor of the second one of the host machines or a corruption of the hypervisor of the second one of the host machines.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 2A-2G illustrate an example architecture for maintaining graceful failover by blocking requests in a virtualization environment.

DESCRIPTION OF EXAMPLE EMBODIMENTS

In particular embodiments, an architecture for maintaining graceful failover by blocking requests in a virtualization environment is provided. A cluster of physical nodes (e.g., servers) may operate on the same network and share various storage devices. Each node may comprise one or more user virtual machines (UVMs), one or more controller/service virtual machines, and a hypervisor, all of which may operate on the node. One node may be designated as a leader node. The leader node, via its controller/service virtual machine, may monitor the activity of the hypervisors operating on the other nodes. If a hypervisor on one of the other nodes fails, the leader node—via its controller/service virtual machine—may detect that this hypervisor is unreachable. This may mean that the node on which the hypervisor operates has potentially failed or is otherwise potentially corrupted. To prevent further corruption from entering the network, the leader node may signal the other nodes to block any request (e.g., I/O request), coming from the potentially failed/corrupted node. In response to this signal, the other nodes may block requests from the potentially failed/corrupted node and send an acknowledgement ("ACK") signal back to the leader node. After the leader node receives an ACK from all the other nodes, the cluster may be considered to be secure and protected from further corruption. Simultaneous with the above, the potentially failed/corrupted node may determine that after a predetermined amount of time, it has not received any responses to its requests. In response to this lack of response, the UVMs may terminate their own operations, either permanently, or for a set amount of time. If the failed hypervisor is repaired and the corruption eliminated within a set amount of time, the UVMs on the failed/corrupted node may resume operations on the same node. If the failed hypervisor is not repaired within the set timeframe, or if another reason causes the failed/corrupted node to be unusable, the UVMs on the failed/corrupted node may be transferred to a new node, which may then be added to the cluster.

Figure 1A:
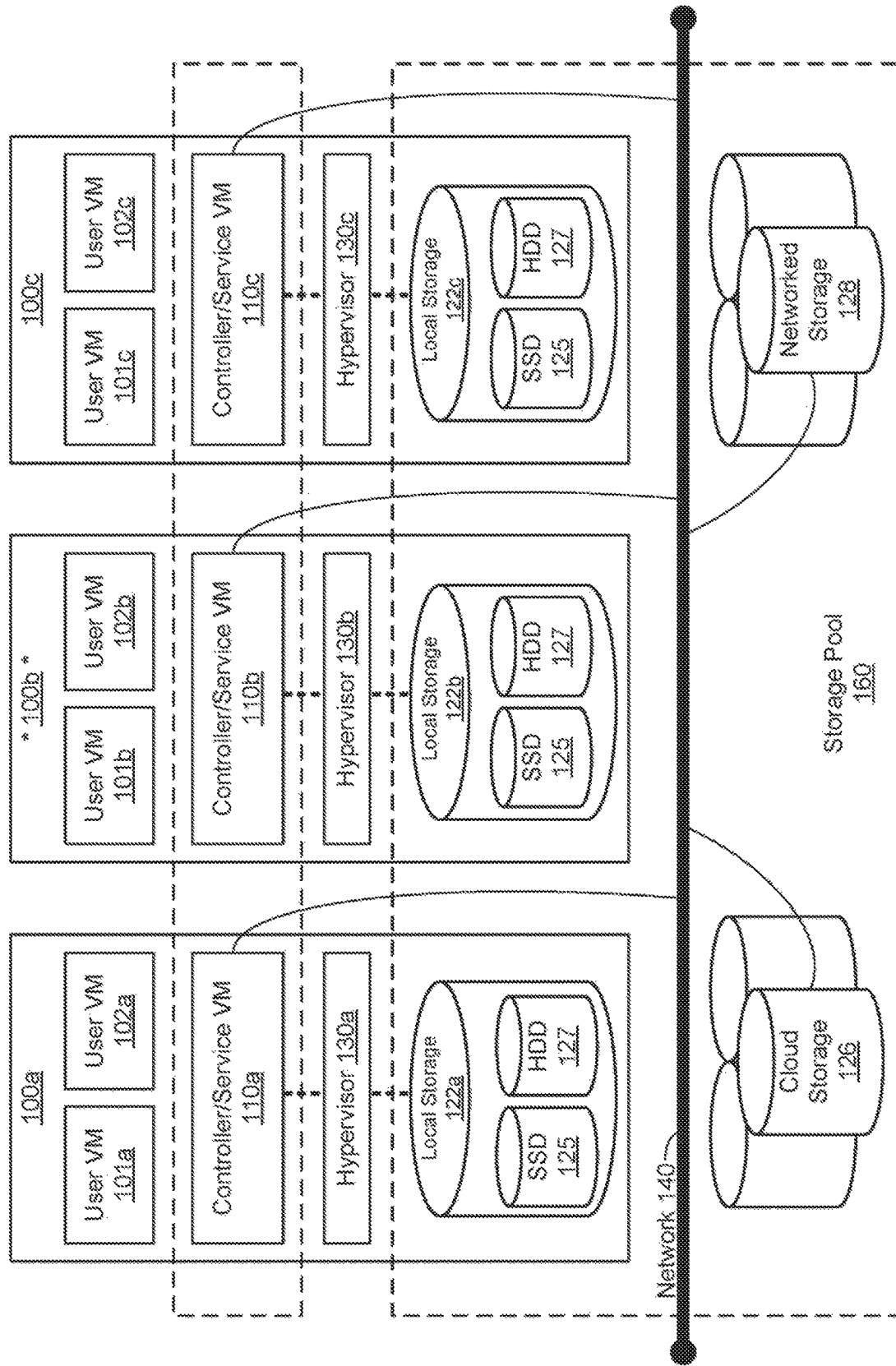
FIG. 1A illustrates a clustered virtualization environment according to some embodiments of the invention.

FIG. 1A illustrates a clustered virtualization environment according to particular embodiments. The architecture of FIG. 1A can be implemented for a distributed platform that contains multiple host machines 100a-c that manage multiple tiers of storage. The multiple tiers of storage may include network-attached storage (NAS) that is accessible through network 140, such as, by way of example and not limitation, cloud storage 126, which may be accessible through the Internet, or local network-accessible storage 128 (e.g., a storage area network (SAN)). Unlike the prior art, the present embodiment also permits local storage 122a-c that is within or directly attached to the server and/or appliance to be managed as part of storage pool 160. Examples of such storage include Solid State Drives 125 (henceforth "SSDs"), Hard Disk Drives 127 (henceforth "HDDs" or "spindle drives"), optical disk drives, external drives (e.g., a storage device connected to a host machine via a native drive interface or a direct attach serial interface), or any other directly attached storage. These collected storage devices, both local and networked, form storage pool 160. Virtual disks (or "vDisks") can be structured from the storage devices in storage pool 160, as described in more detail below. As used herein, the term vDisk refers to the storage abstraction that is exposed by a Controller/Service VM (CVM) 110 to be used by a user VM. In some embodiments, the vDisk is exposed via iSCSI ("internet small computer system interface") or NFS ("network file system") and is mounted as a virtual disk on the user VM.

Each host machine 100a-c runs virtualization software, such as VMWARE ESX(I), MICROSOFT HYPER-V, or REDHAT KVM. The virtualization software includes hypervisor 130a-c to manage the interactions between the underlying hardware and the one or more user VMs 101a, 102a, 101b, 102b, 101c, and 102c that run client software. Though not depicted in FIG. 1A, a hypervisor may connect to network 140. In particular embodiments, a host machine 100 may be a physical hardware computing device; in particular embodiments, a host machine 100 may be a virtual machine.

CVMs 110a-c are used to manage storage and input/output ("I/O") activities according to particular embodiments. These special VMs act as the storage controller in the currently described architecture. Multiple such storage controllers may coordinate within a cluster to form a unified storage controller system. CVMs 110 may run as virtual machines on the various host machines 100, and work together to form a distributed system 110 that manages all the storage resources, including local storage 122, networked storage 128, and cloud storage 126. The CVMs may connect to network 140 directly, or via a hypervisor. Since the CVMs run independently of hypervisors 130a-c, this means that the current approach can be used and implemented within any virtual machine architecture, since the CVMs of particular embodiments can be used in conjunction with any hypervisor from any virtualization vendor.

A host machine may be designated as a leader node within a cluster of host machines. For example, host machine 100b, as indicated by the asterisks, may be a leader node. A leader node may have a software component designated to perform operations of the leader. For example, CVM 110b on host machine 100b may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node.

Each CVM 110a-c exports one or more block devices or NFS server targets that appear as disks to user VMs 101a-c and 102a-c. These disks are virtual, since they are implemented by the software running inside CVMs 110a-c. Thus, to user VMs 101a-c and 102a-c, CVMs 110a-c appear to be exporting a clustered storage appliance that contains some disks. All user data (including the operating system) in the user VMs 101a-c and 102a-c reside on these virtual disks.

Significant performance advantages can be gained by allowing the virtualization system to access and utilize local storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs. Further details regarding methods and mechanisms for implementing the virtualization environment illustrated in FIG. 1A are described in U.S. Pat. No. 8,601,473, which is hereby incorporated by reference in its entirety.

Figure 1B:
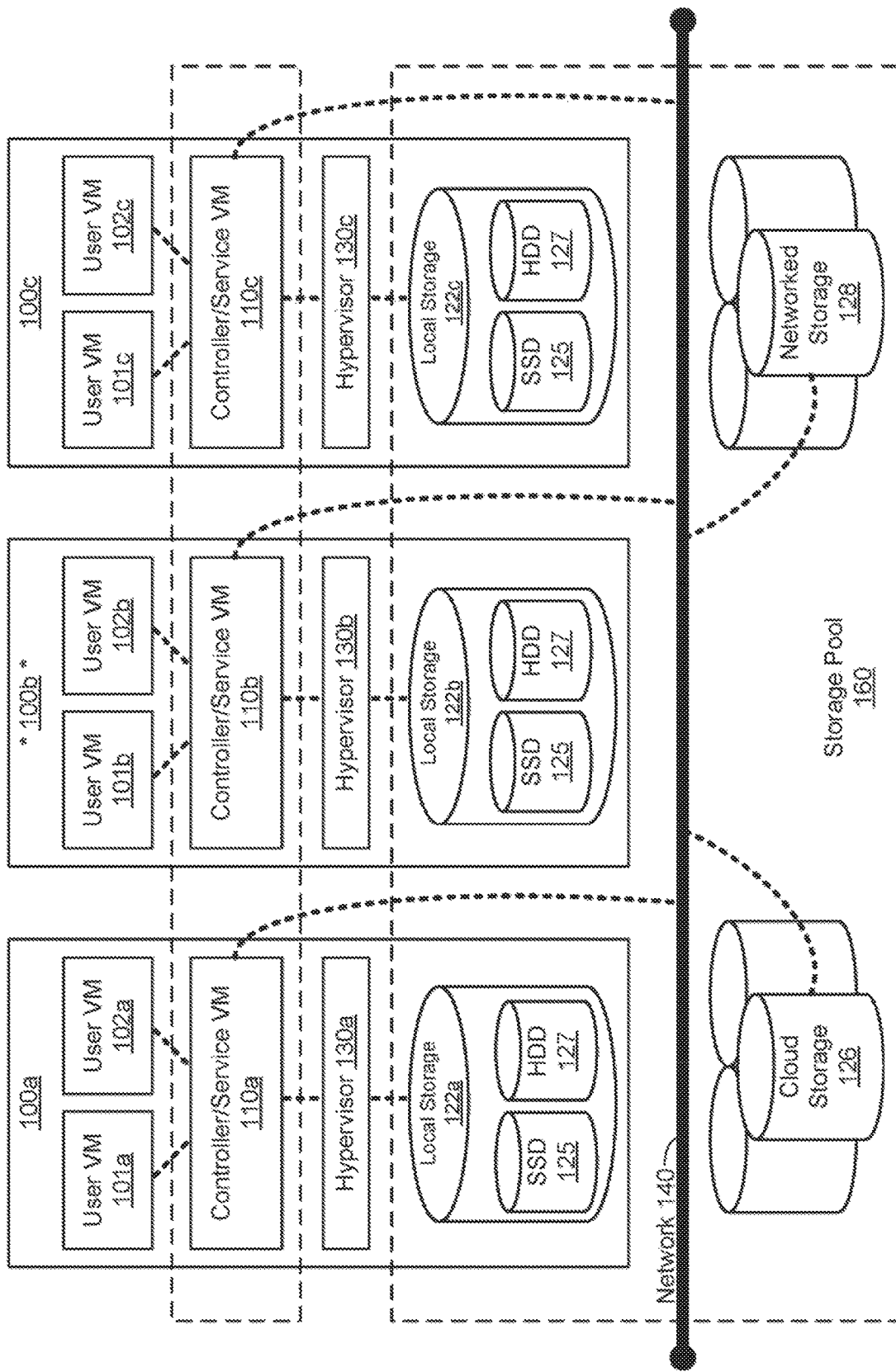
FIG. 1B illustrates data flow within a clustered virtualization environment according to some embodiments of the invention.

FIG. 1B illustrates data flow within an example clustered virtualization environment according to particular embodiments. As described above, one or more user VMs and a CVM may run on each host machine 100 along with a hypervisor. As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 160. Additionally or alternatively, CVM 110a-c may present an emulated storage controller either to the hypervisor or to user VMs to facilitate I/O operations. CVM 110a-c may be connected to storage within storage pool 160. CVM 110a may have the ability to perform I/O operations using local storage 122a within the same host machine 100a, by connecting via network 140 to cloud storage 126 or networked storage 128, or by connecting via network 140 to local storage 122b-c within another host machine 100b-c (e.g., via connecting to another CVM 110b or 110c). In particular embodiments, any suitable computing system 400 may be used to implement a host machine 100.

In particular embodiments, an architecture for maintaining graceful failover by blocking requests in a virtualization environment is provided. FIGS. 2A-2G illustrate an example architecture for maintaining graceful failover by blocking requests in a virtualization environment. A cluster of servers 100a-e may be connected via network 140. Servers 100a-e may also be referred to as host machines, or, more simply, as nodes of the cluster. Node 100c may be designated as a leader node within the cluster. Leader node 100c may monitor the operation of the hypervisors 110a, 110b, 110d, and 110e on the other nodes 100a, 100b, 100d, and 100e (each with its respective CVM 110 and HV 130). In particular embodiments, leader node 100c may monitor the operation of other elements by way of a connection manager located on leader node 100c. The connection manager may poll one or more I/O controllers located on the other nodes 100a, 100b, 100d, and 100e by periodically "pinging" them (e.g., by sending an echo-request, waiting to receive an echo-response, and, if received, measuring the round-trip time from transmission to reception, reporting errors and packet loss, else if not received, generating an error message). For example, when using the iSCSI transport protocol, the connection manager may periodically send a NOP-OUT request to all I/O controllers on nodes 100a, 100b, 100d, and 100e, with the expectation that any available I/O controllers will send back an NOP-IN response within a reasonable time. In particular embodiments, the echo-response from each I/O controller may include additional information regarding the I/O controller, such as its current and/or historical load or its capabilities.

Figure 2A:
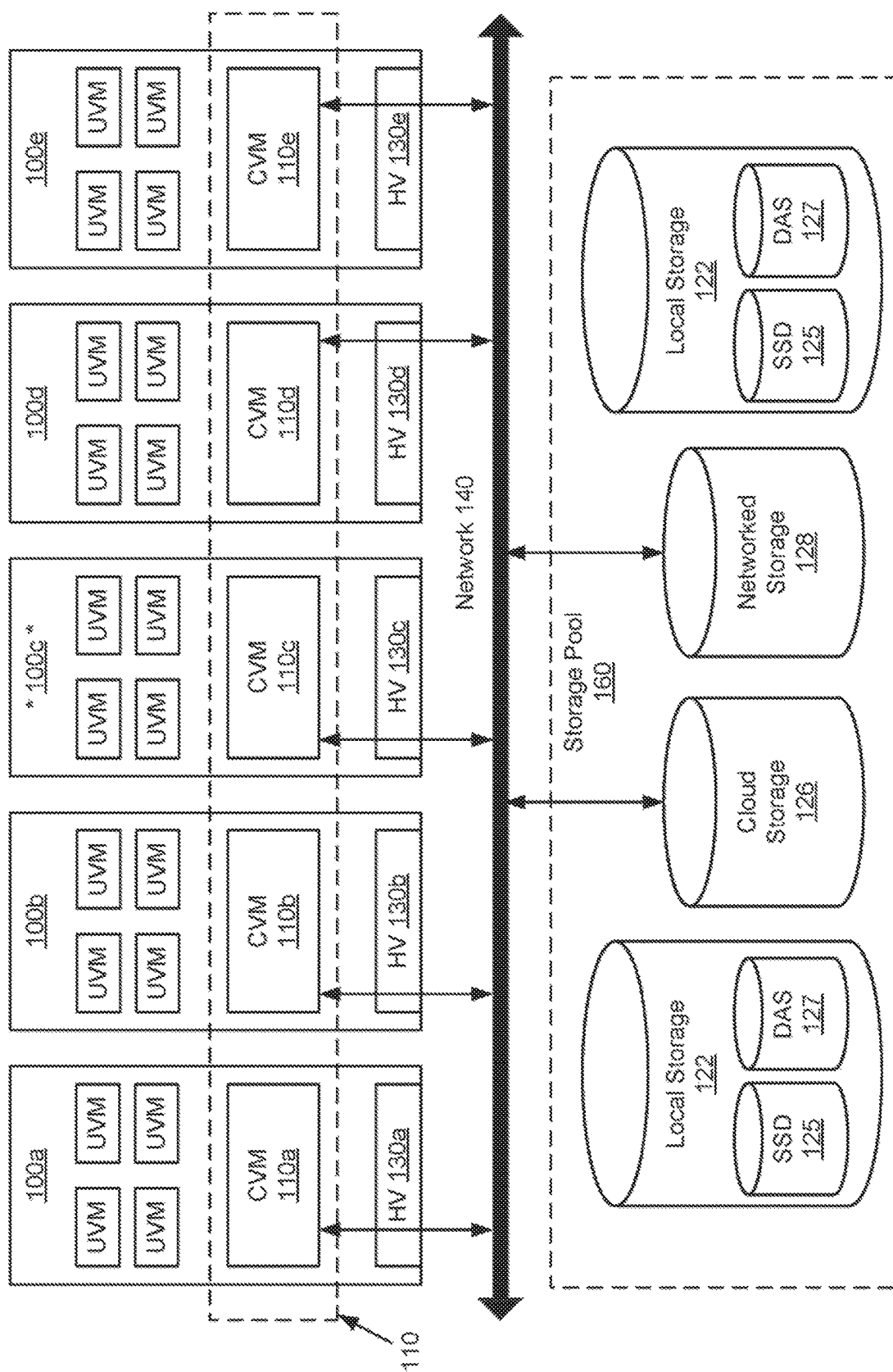
Figure 2B:
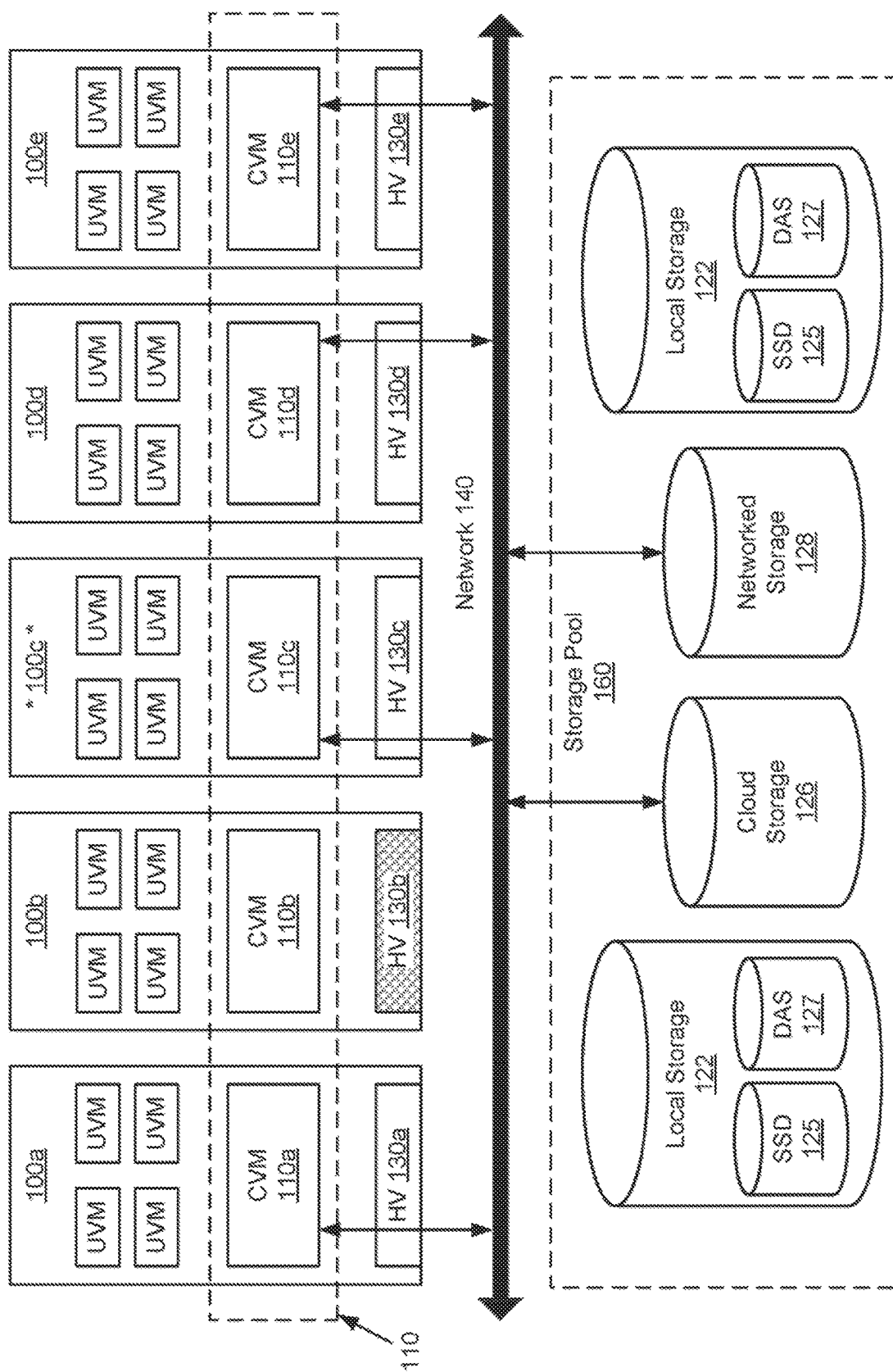

FIG. 2A illustrates a healthy cluster. In a healthy cluster, all nodes may be operating normally. Leader node 100c may be continuously monitoring the operation of the other nodes 100a, 100b, 100d, and 100e, as described above. This monitoring may occur via network 140. In particular embodiments, an echo-request may be sent by leader node 100c to a second node, for example, node 100b, by way of one or more I/O controllers located on node 100b. If the leader node receives no echo-response from any of the I/O controllers on 100b, the leader node may determine or confirm that node 100b is unreachable. In particular embodiments, if one or more I/O controllers located on node 100b responds before a predetermined amount of time, the leader node 100c may determine that node 100b is reachable and operating normally. However, if the predetermined amount of time expires before node 100b responds, leader node 100c may determine that node 100b has failed or is otherwise corrupted. In particular embodiments, the predetermined amount of time may be short (e.g., less than 10 milliseconds). In particular embodiments, hypervisor 130b on node 100b may be the only component of node 100b that fails or becomes corrupted. Even in this case, leader node 100c may still determine that the entire node 100b has failed. FIG. 2B illustrates a situation in which node 100b has become unreachable because hypervisor 130b has failed or has otherwise become corrupted. In particular embodiments, a failed node might not actually have failed. An unreachable node may be unreachable for reasons other than node failure. Regardless of the actual operability of the unreachable node, the leader node 100c may treat an unreachable node as a failed node. Thus, in this disclosure, the terms "unreachable" and "failed" may be used interchangeably.

Figure 2C:
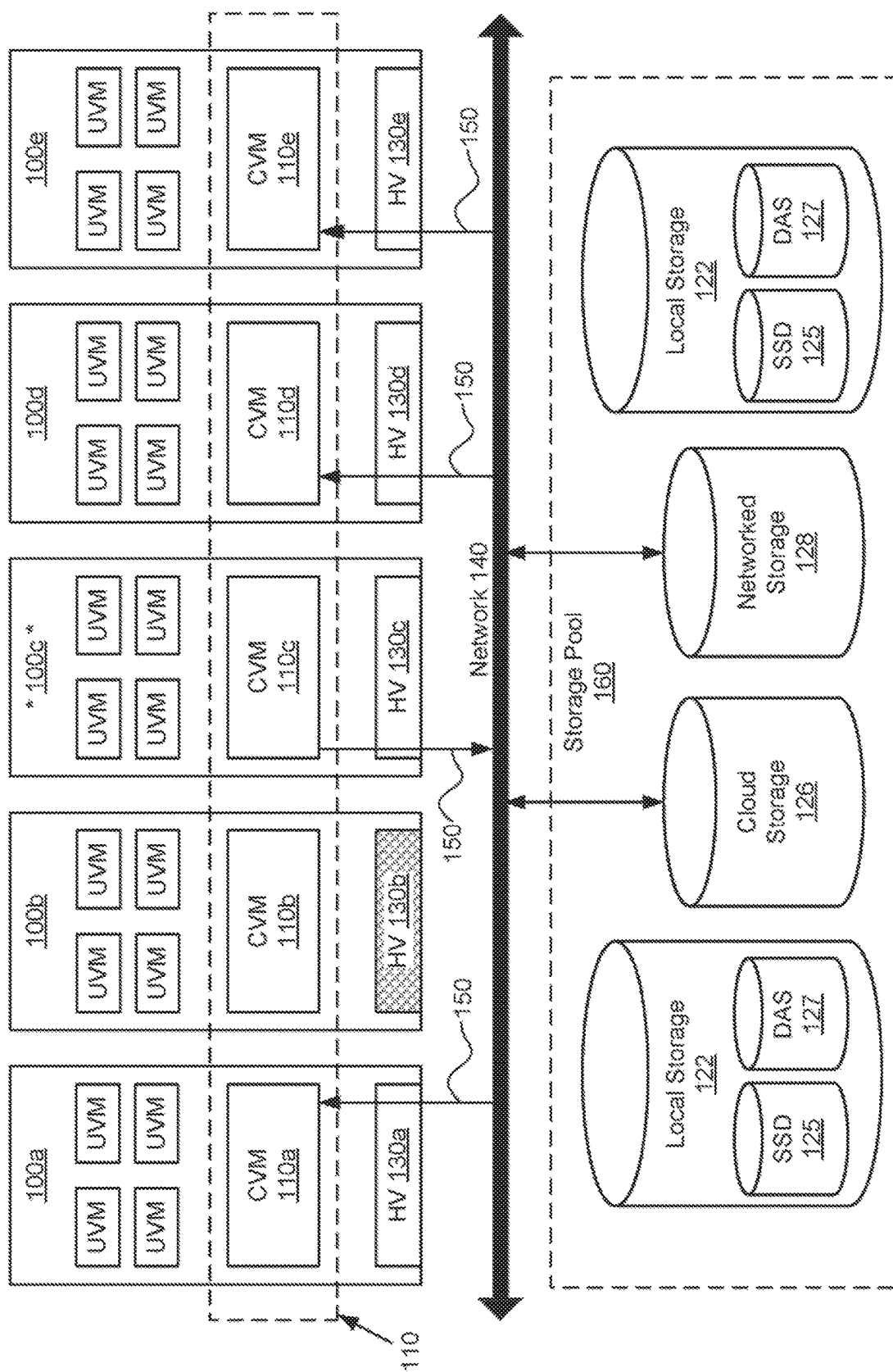

FIG. 2C illustrates the steps that leader node 100c may perform to maintain graceful failover a virtualization environment. Upon confirming that node 100b has become unreachable, leader node 100c may initiate what may be referred to as the "request blocking procedure." Leader node 100c may initiate the request blocking procedure by transmitting a block request message 150 to all the live nodes in the cluster. In this example, node 100c may be the leader node, node 100b may be the failed node, and nodes 100a, 100d, and 100e may be the other live nodes in the cluster. The block request message 150 sent by leader node 100c to live nodes 100a, 100d, and 100e may instruct live nodes 100a, 100d, and 100e to block any request that originates from failed node 100b. In particular embodiments, blocking requests may be accomplished by blocking iSCSI connections from UVMs that operate on failed node 100b. After sending out the block request message 150 to live nodes 100a, 100d, and 100e to block requests from failed node 100b, leader node 100c may wait for an acknowledgement message from live nodes 100a, 100d, and 100e.

Figure 2D:
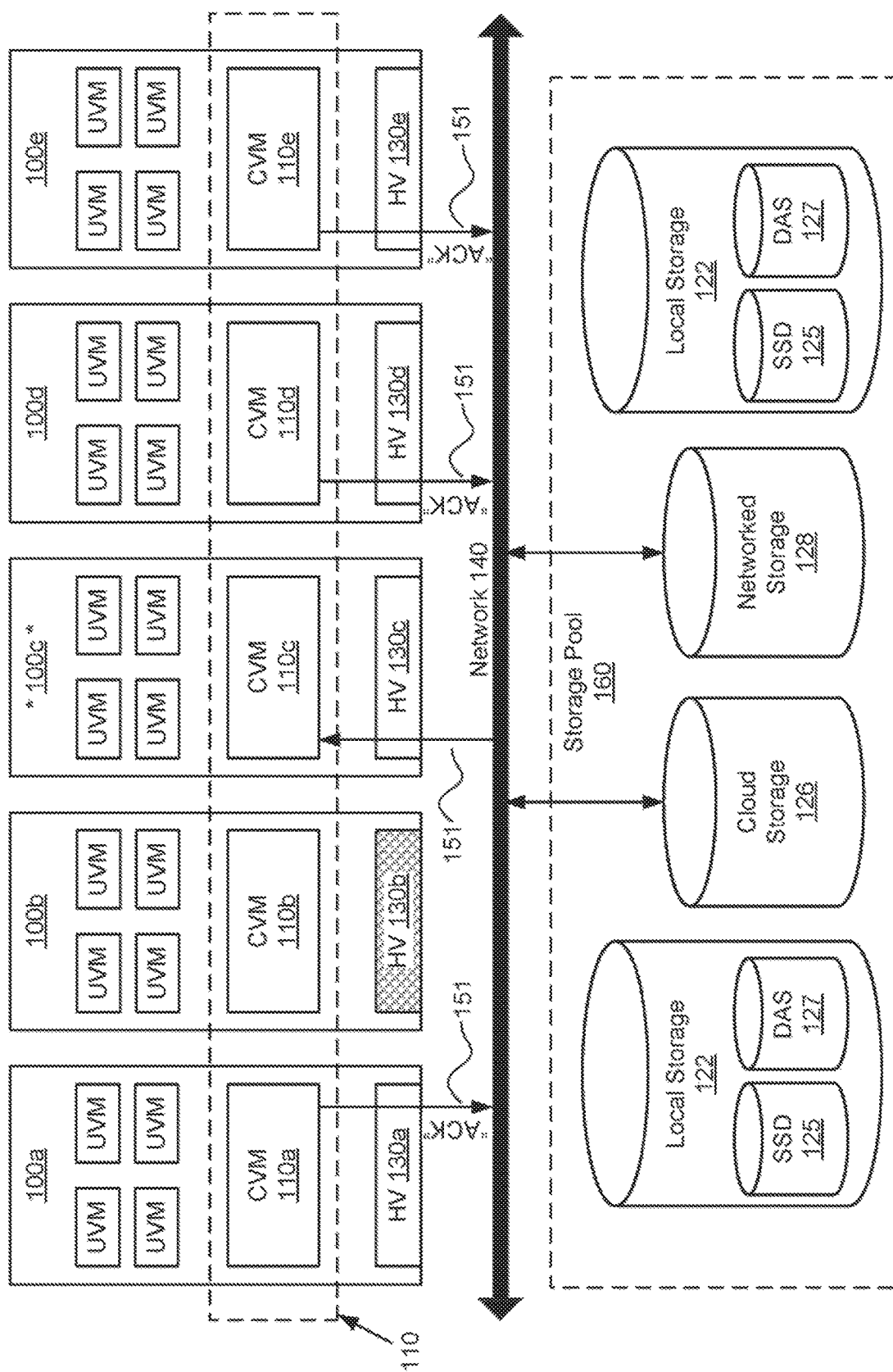

FIG. 2D illustrates the steps that live nodes 100a, 100d, and 100e may perform to maintain graceful failover in a virtualization environment. Communication between nodes may be accomplished via each node's Controller/Service VM (CVM) 110a-e. In particular embodiments, each CVM 110a-e may have one or more I/O controllers for handling data transmissions. In particular embodiments, each CVM 110a-e may maintain a list of the I/O controllers on the other live nodes in the cluster that are available to handle I/O requests. When each CVM on live nodes 100a, 100d, and 100e receives the block request message 150 from leader node 100c, they may each enforce the block request by blocking the iSCSI connections from UVMs on failed node 100b. This may be accomplished by specifying the IP addresses of the I/O controllers on CVM 110b to be blocked in the respective lists maintained by live nodes 100a, 100d, and 100e. Upon blocking iSCSI connections from UVMs on failed node 100b, each live node 100a, 100d, and 100e may transmit an acknowledgement ("ACK") signal 151 back to CVM 110c on leader node 100c. After the leader node receives an ACK from all the other nodes, the cluster may be considered to be secure and protected from further corruption.

Figure 2E:
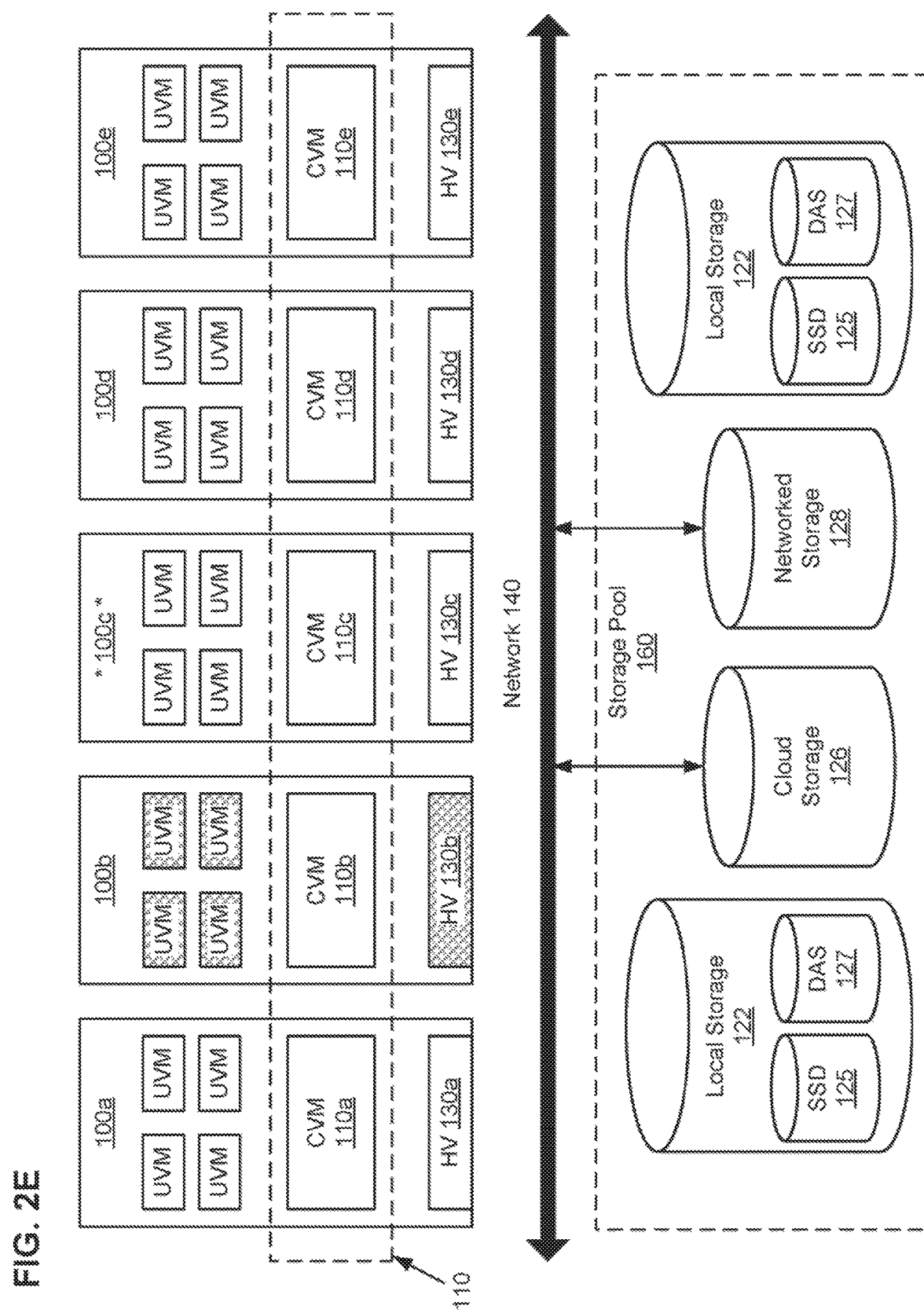

FIG. 2E illustrates the steps that failed node 100b may perform to maintain graceful failover in a virtualization environment. Even if hypervisor 130b has failed or is otherwise corrupted, one or more UVMs on node 100b may continue to transmit requests through CVM 110b. Once the leader node 100c and the other live nodes in the cluster block iSCSI connections from UVMs on failed node 100b, no request sent by UVMs on failed node 100b may receive a response. In particular embodiments, a connection manager located on failed node 100b may periodically check for iSCSI connectivity by sending an echo-request to one or more other live nodes or leader node. In particular embodiments, when an echo-response from one of the other live nodes or leader node is not received after a predetermined amount of time, the UVMs on failed node 100b may terminate operations. The termination of operations by the UVMs on failed node 100b may be temporary (e.g., suspending the UVM) or permanent (e.g., shutting down the UVM), depending on circumstances that will be discussed herein. From FIG. 2E, the UVMs on failed node 100b may either perform the steps illustrated by FIG. 2F or FIG. 2G, as will be discussed below.

FIG. 2F illustrates a first option for further steps that the UVMs on failed node 100b may perform to maintain graceful failover in a virtualization environment. In particular embodiments, when periodic checks for iSCSI connectivity cannot confirm I/O connectivity with failed node 100b, UVMs on failed node 100b may suspend operations. This may be akin to a computer going to sleep or hibernating when not in use. Thus, the UVMs on failed node 100b may suspend operations for a set amount of time. After the set amount of time, CVM 110b may re-try pinging one or more other live nodes in the cluster to check I/O connectivity (e.g., by sending an echo-request to check iSCSI connectivity). If the pings still go unanswered for a predetermined amount of time, the UVMs on failed node 100b may go back to sleep (e.g., suspend operations) for a second set amount of time. This process may repeat itself one or more times, depending on the settings on the UVMs and/or failed node 100b. During this process, CVM 110c on leader node 100c may be monitoring the hypervisors on all the nodes in the cluster, including failed/corrupted hypervisor 130b. If hypervisor 130b is repaired or otherwise becomes uncorrupted, CVM 110c may determine that it is safe to respond to pings from node 100b. Leader node 100c may send a message to the other live nodes instructing them to lift the block request. In other words, the message may instruct the live nodes not to block iSCSI connections from node 100b any longer. In this scenario, a ping from CVM 110b may be answered by one of the live nodes or leader node 100c. If this occurs, the UVMs operating on node 100b may resume operations. Node 100b may no longer be considered to have failed or be in failure.

Figure 2G:
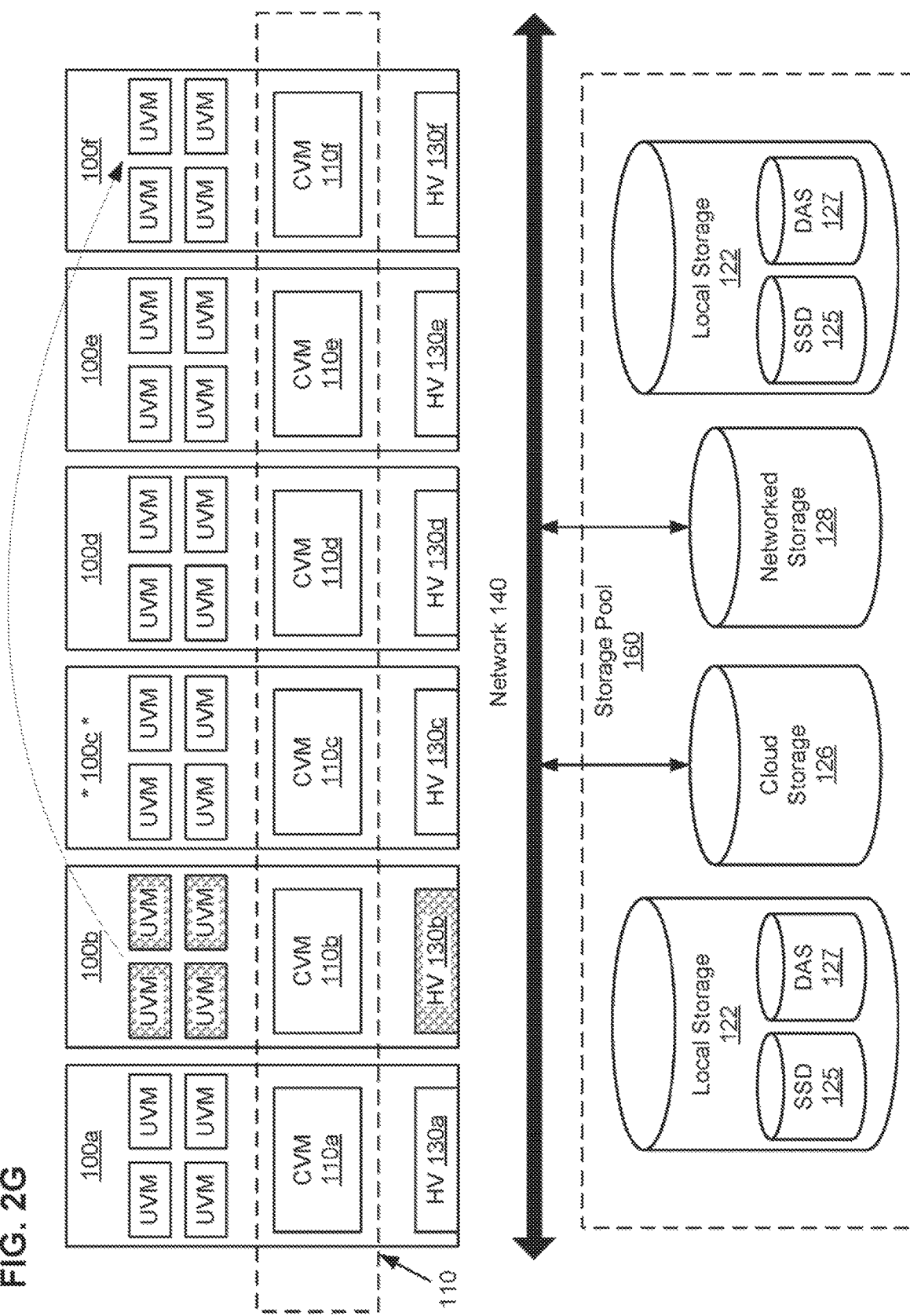

FIG. 2G illustrates a second option for further steps that the UVMs on failed node 100b may perform to maintain graceful failover in a virtualization environment. After a predetermined amount of time or after a predetermined amount of unanswered pings, the UVMs on failed node 100b may permanently shut down. This may be caused by permanent damage to hypervisor 130b or for some other reason that renders node 100b inoperable or permanently corrupted. If this occurs, a new node (e.g., physical host machine) 100f (with associated CVM 110f and HV 130f) may be brought into the cluster and the UVMs that were operating on failed node 100b may be transferred to node 100f. Once transferred onto node 100f, the UVMs may either resume operation or may reset and start operations with no data or memory from the period the UVMs operated on node 100b. In this manner, the cluster of nodes may maintain graceful failover in a virtualization environment. In some embodiments, the UVMs that were operating on failed node 100b may simply be moved to another node in the cluster.

Figure 3:
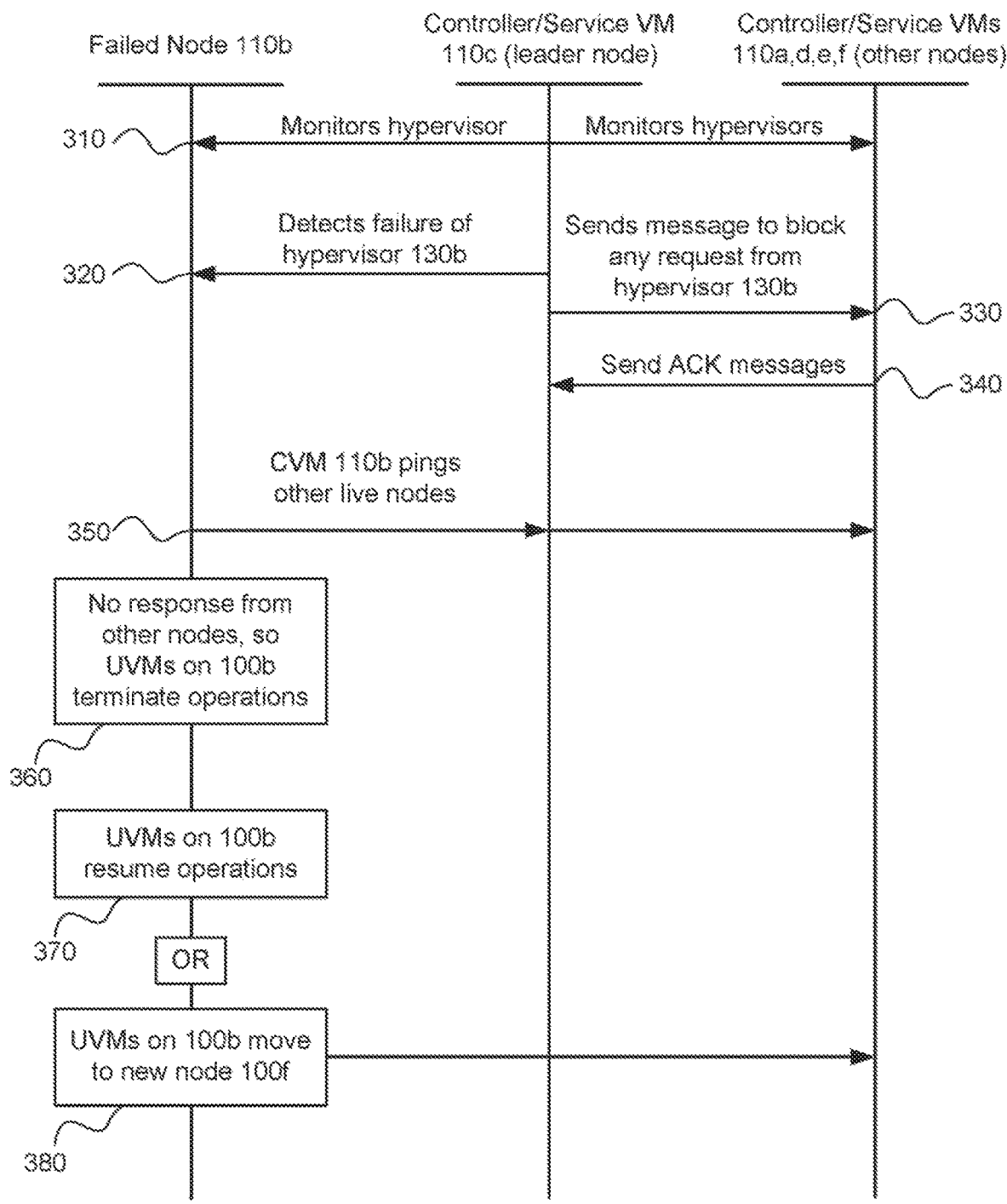
FIG. 3 illustrates an example interaction diagram for maintaining graceful failover by blocking requests in a virtualization environment.

FIG. 3 illustrates an example interaction diagram for maintaining graceful failover by blocking requests in a virtualization environment. The interaction diagram may illustrate a system for managing communication connections in a virtualization environment. The system may comprise a cluster of host machines (e.g., nodes) implementing the virtualization environment, wherein each of the host machines comprises a hypervisor, at least one UVM, a connection manager, and an I/O controller (located on a CVM on each node), and wherein a first one of the host machines is designated as a leader node. The system may further comprise a virtual disk comprising a plurality of storage devices, the virtual disk being accessible by all of the I/O controllers, wherein the I/O controllers conduct I/O transactions with the virtual disk based on I/O requests received from the UVMs.

The interaction diagram of FIG. 3 may illustrate a step-by-step process of how the various components in the node cluster interact to maintain graceful failover by blocking requests in a virtualization environment. The interaction diagram may begin at step 310, where a leader node 100c may monitor the operation of the hypervisors on the other nodes 100a, 100b, 100d, and 100e. This monitoring may be accomplished by way of a connection manager located on leader node 100c. The connection manager may poll one or more I/O controllers located on the other nodes 100a, 100b, 100d, and 100e by periodically "pinging" them (e.g., by sending an echo-request, waiting to receive an echo-response, and, if received, measuring the round-trip time from transmission to reception, reporting errors and packet loss, else if not received, generating an error message). At step 320, the leader node (e.g., CVM 110c) may confirm that a second one of the host machines is unreachable and may transmit an update message to other host machines in the cluster identifying the unreachable host machine. In other words, CVM 110c may have detected that the hypervisor 130b on node 100b has become unresponsive or is otherwise unreachable. At this point, CVM 110c may consider node 100b to have failed, and then CVM 110c may initiate a request blocking procedure. At step 330, CVM 110c may send a block request message to the other live nodes in the cluster. This block request message may instruct live nodes 100a, 100d, and 100e to block any request that originates from failed node 100b. This may be accomplished by blocking iSCSI connections from UVMs that operate on failed node 100b. At step 340, the other host machines may block messages from the unreachable host machine and may send an acknowledgement of the block and/or message back to the leader node. In other words, when each CVM on live nodes 100a, 100d, and 100e receive the block request message 150 from leader node 100c, they may each enforce the block request by blocking the iSCSI connections from UVMs on failed node 100b. This may be accomplished by specifying the IP addresses of the I/O controllers on CVM 110b to be blocked in the respective lists maintained by live nodes 100a, 100d, and 100e. The CVMs on the live nodes may then send an ACK signal back to CVM 110c acknowledging receipt of the block request message.

At step 350, one or more UVMs running on the second one of the host machines (e.g., failed node 100b) may attempt to send requests to one or more of the CVMs 110 on other hosts. This may be accomplished by the following: CVM 110b on failed node 100b may ping the other live nodes in the cluster or the leader node. After a predetermined amount of time without receiving a response or after a predetermined number of unanswered pings, at step 360, the UVMs on node 100b may determine that no response is being received to any of its messages sent to any other host machines in the cluster and terminate operations. CVM 110b may continue to periodically ping other nodes in the cluster to check I/O connectivity. At step 370, if one or more of the pings is answered, the UVMs on 100b may resume operations on node 100b. At step 380, if none of the pings are answered, the UVMs on 100b may be transferred to a new node 100f. Once on node 100f, the UVMs may resume the operations they were previously performing on failed node 100b, or they may reset and restart.

Particular embodiments may repeat one or more steps of the interaction diagram of FIG. 3, where appropriate. Although this disclosure describes and illustrates particular steps of the interaction diagram of FIG. 3 as occurring in a particular order, this disclosure contemplates any suitable steps of the interaction diagram of FIG. 3 occurring in any suitable order. Moreover, although this disclosure describes and illustrates an example method for maintaining graceful failover by blocking requests in a virtualization environment including the particular steps of the interaction diagram of FIG. 3, this disclosure contemplates any suitable method for maintaining graceful failover by blocking requests in a virtualization environment including any suitable steps, which may include all, some, or none of the steps of the interaction diagram of FIG. 3, where appropriate. Furthermore, although this disclosure describes and illustrates particular components, devices, or systems carrying out particular steps of the interaction diagram of FIG. 3, this disclosure contemplates any suitable combination of any suitable components, devices, or systems carrying out any suitable steps of the interaction diagram of FIG. 3.

In particular embodiments, the second one of the host machines may be unreachable because its hypervisor failed or became corrupted. Alternatively, the second one of the host machines may be unreachable for another reason, such as the host machine itself became damaged, or the CVM on the host machine became corrupted or otherwise failed. This disclosure contemplates all causes as to why the second one of the host machines may become unreachable.

In particular embodiments, the method described above may further comprise, by the one or more UVMs running on the second one of the host machines, after terminating operations: determining that a response has been received to a message sent to one of the other host machines in the cluster; and resuming operations on the same host machine. This may be accomplished by the following: the CVM on the second one of the host machines may periodically ping the other live nodes in the cluster or the leader node. After a predetermined amount of time without receiving a response or after a predetermined number of unanswered pings, the UVMs on the second one of the host machines may terminate operations. The CVM on the second one of the host machines may continue to periodically ping other nodes in the cluster to check I/O connectivity. If one of the pings is answered, the UVMs on the second one of the host machines may resume operations on the same machine (e.g., the second one of the host machines).

In particular embodiments, the method described above may further comprise, by the one or more UVMs running on the second one of the host machines, after terminating operations: transferring operations to a new host machine different from the first one of the host machines and the other host machines. This may be accomplished by the following: if none of the pings sent by the second one of the host machines are answered, the UVMs on the second one of the host machines may be transferred to a new host machine that may then be included in the cluster. Once transferred, the UVMs may resume the operations they were previously performing on the second one of the host machines, or they may reset and restart.

Figure 4:
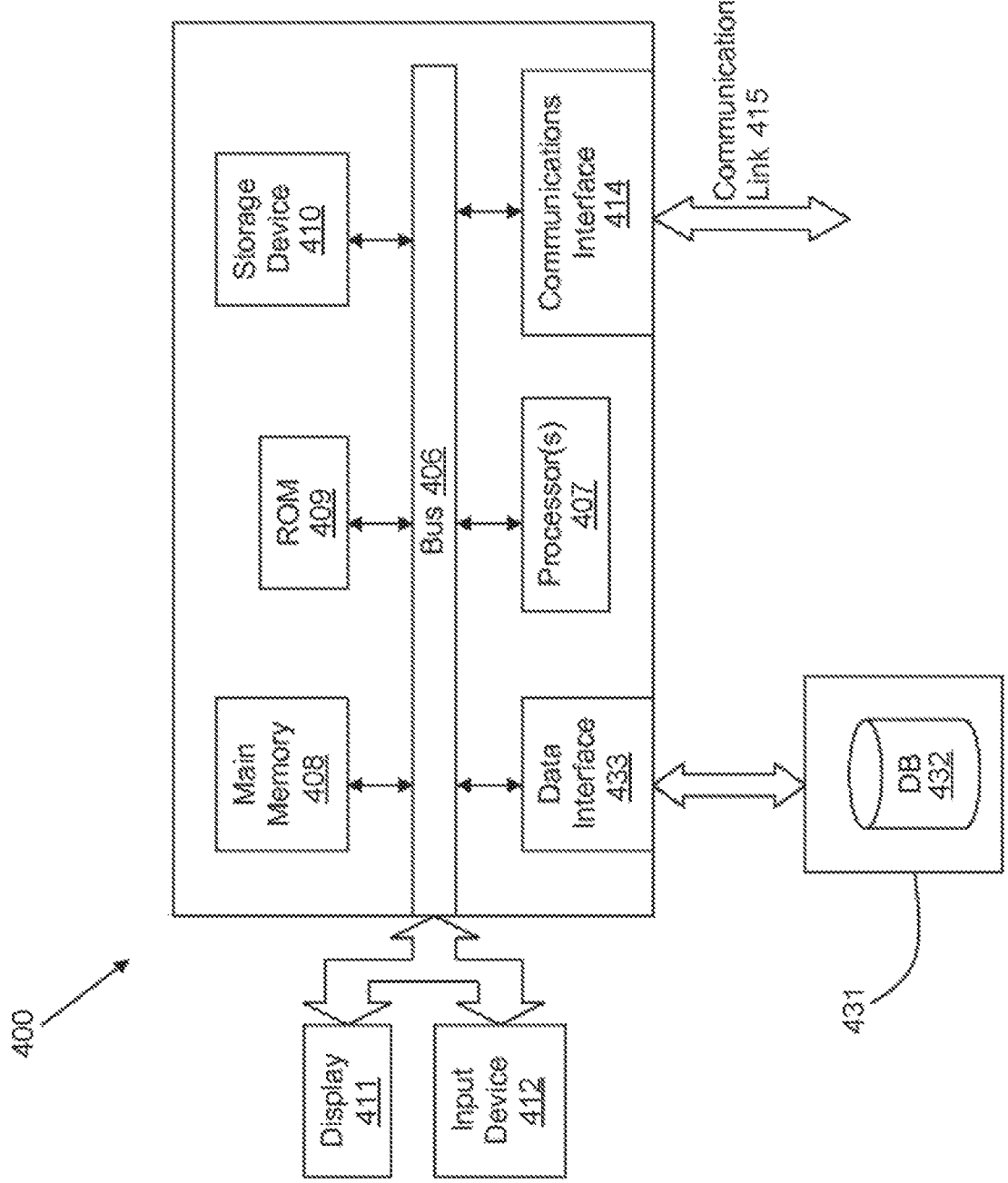
FIG. 4 illustrates a block diagram of a computing system suitable for implementing an embodiment of the present invention.

FIG. 4 is a block diagram of an illustrative computing system 400 suitable for implementing an embodiment of the present invention. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

Computer system 400 includes a bus 406 (e.g., an address bus and a data bus) or other communication mechanism for communicating information, which interconnects subsystems and devices, such as processor 407, system memory 408 (e.g., RAM), static storage device 409 (e.g., ROM), disk drive 410 (e.g., magnetic or optical), communication interface 414 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), display 411 (e.g., CRT, LCD, LED), input device 412 (e.g., keyboard, keypad, mouse, microphone). In particular embodiments, computer system 400 may include one or more of any such components.

According to one embodiment of the invention, computer system 400 performs specific operations by processor 407 executing one or more sequences of one or more instructions contained in system memory 408. Such instructions may be read into system memory 408 from another computer readable/usable medium, such as static storage device 409 or disk drive 410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 407 for execution. Such a medium may take many forms, including but not limited to, nonvolatile media and volatile media. Non-volatile media includes, for example, optical or magnetic disks, such as disk drive 410. Volatile media includes dynamic memory, such as system memory 408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 400. According to other embodiments of the invention, two or more computer systems 400 coupled by communication link 415 (e.g., LAN, PTSN, or wireless network) may perform the sequence of instructions required to practice the invention in coordination with one another.

Computer system 400 may transmit and receive messages, data, and instructions, including program, e.g., application code, through communication link 415 and communication interface 414. Received program code may be executed by processor 407 as it is received, and/or stored in disk drive 410, or other non-volatile storage for later execution. A database 432 in a storage medium 431 may be used to store data accessible by the system 400 by way of data interface 433.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system comprising:
   a first host machine having programmed instructions to:
   determine that a second host machine is unreachable;
   request a third host machine to block requests from the second host machine upon determining that the second host machine is unreachable;
   determine that the second host machine has become reachable; and request the third host machine to stop blocking requests from the second host machine upon determining that the second host machine has become reachable.

2. The system of claim 1, wherein after the first host machine determines that the second host machine is unreachable and the second host machine does not receive a response from the third host machine to a message sent by a virtual machine on the second host machine, the virtual machine on the second host machine suspends an operation for a predetermined period of time.

3. The system of claim 2, wherein the virtual machine resumes operation on the second host machine after the response is received from the third host machine.

4. The system of claim 2, wherein the virtual machine, after expiration of the predetermined period of time, again sends the message to the third host machine.

5. The system of claim 1, wherein after the first host machine determines that the second host machine is unreachable, a virtual machine on the second host machine is transferred to a new host machine to perform an operation terminated on the second host machine.

6. The system of claim 1, wherein the first host machine requests the third host machine to block requests from the second host machine by sending an update message to the third host machine identifying the second host machine.

7. The system of claim 6, wherein the third host machine, upon receiving the update message, transmits an acknowledgment to the first host machine.

8. The system of claim 1, wherein the first host machine determines that the second host machine is unreachable by transmitting an echo-request to the second host machine, and failing to receive an echo-response from the second host machine within a predetermined amount of time.

9. The system of claim 1, wherein the first host machine determines that the second host machine has become reachable by transmitting an echo-request to the second host machine and receiving an echo-response from the second host machine within a predetermined amount of time.

10. The system of claim 1, wherein the first host machine requests a third host machine block communication to the second host machine upon determining that the second host machine is unreachable.

11. A method comprising:
determining, by a first host machine, that a second host machine is unreachable;
requesting, by the first host machine, a third host machine to block requests from the second host machine upon determining that the second host machine is unreachable;
determining, by the first host machine, that the second host machine has become reachable; and
requesting, by the first host machine, the third host machine to stop blocking requests from the second host machine upon determining that the second host machine has become reachable.

12. The method of claim 11, wherein the second host machine is unreachable due to a failure of a hypervisor or a corruption of the hypervisor of the second host machine.

13. The method of claim 11, further comprising:
sending, by the first host machine, an update message to the third host machine identifying the second host machine for requesting the third host machine to block requests from the second host machine; and
receiving, by the first host machine, an acknowledgment back from the third host machine confirming the blocking of requests from the second host machine.

14. The method of claim 11, wherein after the first host machine determines that the second host machine is unreachable and the second host machine does not receive a response from the third host machine to a message sent by a virtual machine on the second host machine, the virtual machine on the second host machine suspends an operation for a predetermined period of time.

15. The method of claim 11, wherein after the first host machine determines that the second host machine is unreachable, a virtual machine on the second host machine is transferred to a new host machine, and wherein an operation of the virtual machine that was terminated on the second host machine is resumed on the new host machine.

16. The method of claim 11, further comprising determining, by the first host machine, that the second host machine is unreachable by transmitting an echo-request to the second host machine, and not receiving an echo-response from the second host machine within a predetermined amount of time.

17. The method of claim 11 further comprising determining, by the first host machine, that the second host machine has become reachable by transmitting an echo-request to the second host machine and receiving an echo-response back from the second host machine within a predetermine amount of time.

18. The method of claim 11, wherein the first host machine is a leader node in a cluster.

19. The method of claim 11, wherein the third host machine identifies an IP address of the second host machine for blocking requests from the second host machine.

20. The method of claim 11, further comprising requesting a third host machine block communication to the second host machine upon determining that the second host machine is unreachable.

21. A non-transitory computer readable media having computer-executable instructions embodied thereon that, when executed by a processor cause the processor to perform a process comprising:
determining that a first host machine is unreachable;
requesting a second host machine to block requests from the first host machine upon determining that the first host machine is unreachable;
determining that the first host machine has become reachable; and
requesting the second host machine to stop blocking requests from the first host machine upon determining that the first host machine has become reachable.

22. The non-transitory computer readable media of claim 21, further comprising:
sending a first message to the first host machine and determining that the first host machine is unreachable upon not receiving a response from the first host machine to the first message within a first predetermined period of time; and
sending a second message to the second host machine upon determining that the first host machine is unreachable for requesting the blocking of requests from the first host machine to the second host machine.

23. The non-transitory computer readable media of claim 21, further comprising determining that the second host machine is unreachable by transmitting an echo-request to the second host machine, and not receiving an echo-response from the second host machine within a predetermined amount of time.

24. The non-transitory computer readable media of claim 21, further comprising determining, by the first host machine, that the second host machine has become reachable by transmitting an echo-request to the second host machine and receiving an echo-response back from the second host machine within a predetermine amount of time.

25. A non-transitory computer readable media having computer-executable instructions embodied thereon that, when executed by a processor cause the processor to perform a process comprising:
   determining that a first host machine is unreachable;
   requesting a second host machine to block requests from the first host machine upon determining that the first host machine is unreachable;
   determining that the first host machine has become reachable;
   requesting the second host machine to stop blocking requests from the first host machine upon determining that the first host machine has become reachable; and
   receiving a third message from the second host machine confirming the blocking of requests from the first host machine to the second host machine.

26. The non-transitory computer readable media of claim 25, further comprising:
   sending a fourth message to the first host machine and determining that the first host machine has become reachable upon receiving a response from the first host machine to the fourth message within a second predetermined period of time; and
   sending a fifth message to the second host machine for requesting the resuming of receiving requests from the first host machine upon determining that the first host machine has become reachable.

* * * * *